Aug. 5, 1930.                C. K. HENRY                 1,772,252
                        TAMPER INDICATING DEVICE
                          Filed Feb. 2, 1928
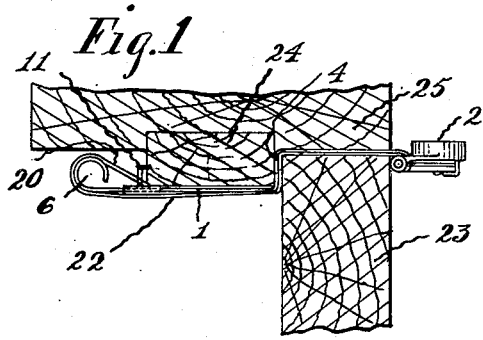
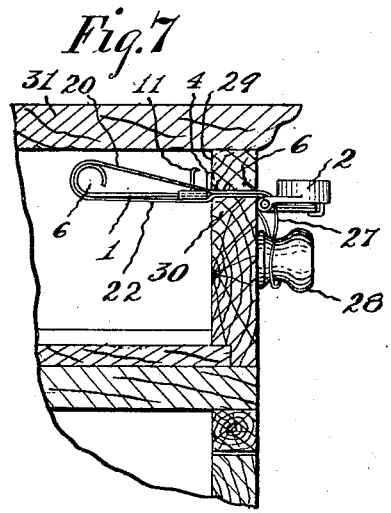
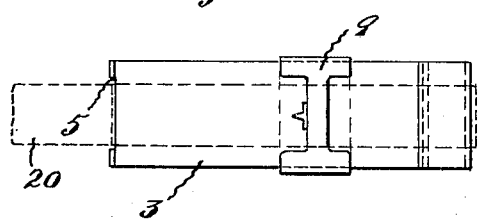
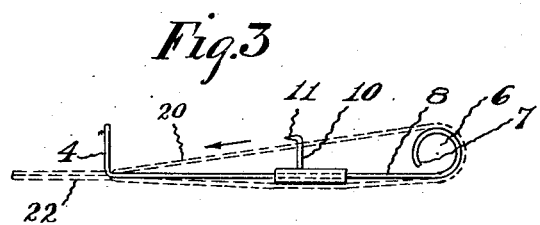
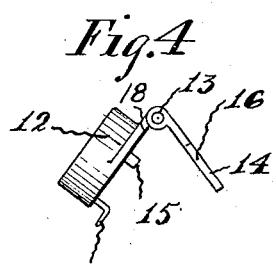
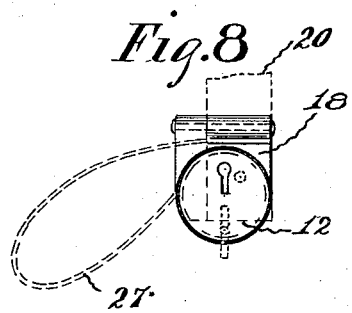
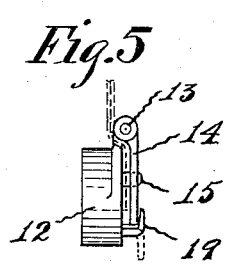
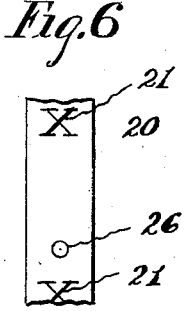
INVENTOR
Charles K. Henry,
BY
Harold O. Penney
ATTORNEY Patented Aug. 5, 1930

1,772,252

UNITED STATES PATENT OFFICE

CHARLES K. HENRY, OF NEWARK, NEW JERSEY

TAMPER-INDICATING DEVICE

Application filed February 2, 1928. Serial No. 251,331.

This invention relates to a device for indicating whether closed or open doors, drawers, desks, suit cases and other lockable devices, have been tampered with.

One of the main objects of this invention is to provide means for use in connection with closure members of compartments of any type, such means being so constructed as to indicate upon the opening of the said closure members whether the compartments have been surreptitiously tampered with by unauthorized persons.

Another important object of my invention is to provide a tamper indicating sealing device adaptable for use on different types of compartments, in a locked or unlocked condition, for sealing them against unauthorized opening, the device being so constructed as to be practically universal in its adaptation to the various conditions encountered.

Another object of this invention is to provide a sealing device comprising a pair of means cooperating with a compartment closure member and a comparatively easily destroyed connecting means joining said means as a seal for said closure member when in locked or unlocked closed state which readily breaks and tears, when said closure member is opened, in such a manner as not to be replacable by any unauthorized persons who have surreptitiously tampered with the closed compartment.

Still another object of the invention is to provide a sealing means, the indicating means of which is made of paper of reasonable strength printed with a repeated serial number thereon, or other suitable identifying indicia which cannot be readily duplicated, whereby the user thereof may effectually seal a closed room, desk, closet, valise or any closed compartment with a paper which permits ready identification, and which paper is held only by the owner of the sealing means or those authorized by the owner, and which paper is not readily replaceable by an unauthorized person tampering with the sealed compartment.

These and other capabilities will be ascertained as the herein disclosure proceeds, and it is obvious that modifications may be made in the general principles without departing from the spirit of the invention or the scope of the appended claims.

In the drawings:

Fig. 1 is an enlarged sectional view, showing a fragment of a door jamb and a fragment of a door with my device applied thereto.

Fig. 2 is a plan view of the anchor.

Fig. 3 is a side elevation thereof.

Fig. 4 is a side view of the lock.

Fig. 5 is a side view of the same lock showing it in locked position.

Fig. 6 is a fragmentary front view of the sealing strip.

Fig. 7 is a sectional view of a desk drawer with my device applied thereto in a modified manner.

Fig. 8 is a front view of the lock shown in Fig. 7, showing mode of locking the seal in operative position.

Referring to the accompanying drawing in which like characters of reference indicate the same parts in the different views, the sealing device consists of two operative members an anchor 1 and a lock 2. The anchor 1 as shown in Figs. 2 and 3, in detail, is a flat strip of metal 3, having one end upturned and cut away as at 5 to form a pair of spaced guides 4. The opposite end of the strip 3 is rolled over so that the edge 7 almost contacts with the upper surface 8 of the strip 3.

A runner comprising an endless band of metal 9, I-shaped on the side contacting with the upper surface 8 of the strip 3 and adapted to slide from one end to the other of the strip 3, carries an upstanding pin 10 having a bent point 11.

The lock 2, in detail comprises a circular lock barrel 12 connected to a circular clasp 14 by a hinge 13. A pin 15 affixed to the lock barrel 12 cooperates with an aperture 16 in the clasp 14. A portion of the lock barrel 12 is spaced from the hinge connection 13 so as to provide a slot 18 therebetween. A bent latch 19 is actuated by a key inserted into the lock barrel 12 to positively retain the clasp 14 against the pin 15.

To contact the anchor 1 and the lock 2 a strip of paper 20 is provided as shown in Fig.

1. This strip of paper is of a tough nature, but readily tearable. An identification mark 21 appears at spaced intervals on this strip of paper and serves as a check on the authenticity of the seal.

When it is desired to assemble the seal, a strip of paper is placed between the guides 4 and the loose ends of the strip are brought into contact as at 22 in Fig. 3. The pin 11 pierces one of the folds, and both folds contact the rolled end 6 of the anchor.

Assuming that a door to a room, closet or some such compartment, is to be sealed, the anchor and paper positioned thereon, are located in the doorway as shown in Fig. 1. The guide end 4 of the anchor is placed in the angle formed by the door 23 and the stile 24, thus urging the rolled end 6 of the anchor towards the stile when the ends 22 of the strip of paper are drawn between the door and the jamb 25. The function of the runner 9 is to positively position the anchor against the stile, by having the point 11 dug into the stile 24; and also adjust the runner for various widths of stiles. The lock 2 is placed on the exterior of the door and the ends 22 of the strip of paper threaded through the slot 18, then between the clasp 14 and the circular lock barrel. The clasp is brought against the pin 15, puncturing the paper as at 26, and the latch 19 actuated by a key, to positively lock the paper in place.

Fig. 5 shows the paper, in dotted lines, positioned in the lock 2, the latch 19 having been swung into locking position. The resulting relation between the various elements, described heretofore, and the door is shown in Fig. 1. The hinge 13 rests against the door 23 and the weight of the lock 2 serves to keep the paper strip taut and the pin 10 and rolled end 6 firmly braced against door and stile. The door is now sealed against any unauthorized opening. Obviously, only the owner or one authorized by him, possesses the paper marked with the identification mark 21. Consequently, when the door is surreptitiously opened by any unauthorized person, the pressure of the door against the hinge 13 strains the paper to the breaking point, and tears it. Just enough paper is used to pass into the lock 2 and no more. Hence it is at once evident to the owner of the paper, when he returns to examine the door that the door has been tampered with.

When used in connection with a drawer on a desk, as shown in Fig. 7, an additional check may be provided by threading a piece of wire 27 through the lock 2 and around the knob 28 of the drawer. In this case, should there not be a stile, the strip of paper is threaded between the anchor and lock as in Fig. 1. But in this position, the guide end 4 of the anchor is drawn against the jamb 29 and drawer door 30, so that the anchor assumes a position as shown, the bent pin tip 11 retaining the paper strip as shown.

The action in this position is the same as in Fig. 1. A surreptitious opening indicates to the owner of the desk, by the tell-tale broken wire and torn paper, that the door has been tampered with.

It is to be understood that I am not limited to paper as the connecting means between the anchor and the lock. Any other material may be used. The device is of course adapted to be used on any type of compartment in connection with any type of closure member therefor.

The embodiments illustrated are shown by way of preference only. Many and various changes may be made without departing from the scope of the invention as defined in the broader claims.

What I claim is:

1. A device of the class described comprising a strip of paper normally associated with the door of a closed room, means retaining said strip in the interior of said room adapted to anchor said strip against the jamb of said room, and lock means retaining said strip on the exterior of said room adapted to displace said strip from normal position upon opening of said door.

2. A room tampering indicator comprising an anchor, a lock clasp associated with said anchor, a strip of paper bearing authorized identification operatively associated with both said anchor and lock clasp, guide means associated with said anchor adapted to retain said strip of paper in fixed relation to said anchor, an adjustable pin member slidably associated with said anchor, a pin associated with said lock clasp adapted to fixedly retain said paper in relation to said lock clasp, latch means associated with said lock clasp adapted to lock said paper in said lock clasp, said anchor adjustable pin adapted to tension said paper when said lock clasp is moved in a direction opposite to said anchor.

3. In a device of the class described a strip of severable material, having thereon a part, to be positioned between the jamb and closure of a compartment, when the latter is closed, a means, to be secured in position interiorly of said compartment, for holding the inner end of said strip in position, and a member, to be located exteriorly of said compartment and disposed in close proximity to said closure, when the latter is closed, for securing the outer end of said strip to said closure, said means to cooperate with said member to sever said strip when said closure is tampered with in a way to surreptitiously open the same.

4. In a device of the class described an anchor means, to be secured to a stationary part of a compartment interiorly of the latter, a lock means, to be disposed exteriorly of the closure of said compartment and in close proximity to said closure, when the latter is closed, and a strip of severable material, to have one of its ends engaged by said anchor means and the other end thereof locked by said lock means, whereby said strip may be severed by the surreptitious opening of said closure.

5. In a device of the class described a strip of severable material, having thereon identification indicia, to have one of its ends secured to a stationary part of a compartment interiorly of the latter, and a means for locking the other end of said strip in close proximity to the closure of said compartment, exteriorly of said closure, when the latter is closed, whereby said strip may be severed by the surreptitious opening of said closure.

6. In combination with a compartment, having an openable closure, a strip of severable material, to be normally engaged by said closure when the latter is closed, an anchor, to be positioned interiorly of said compartment, an adjustable part on said anchor, to hold one end of said strip to a stationary part of said compartment, and a lock, to be disposed exteriorly of said compartment in close proximity to said closure, when the latter is closed, for engaging the other end of said strip, whereby to sever said strip when said closure is surreptitiously opened.

Signed at Newark, in the county of Essex and State of New Jersey, this 24th day of January A. D. 1928.

CHARLES K. HENRY.